(12) United States Patent
Chang et al.

(10) Patent No.: US 12,514,522 B2
(45) Date of Patent: Jan. 6, 2026

(54) MOBILE TOMOSYNTHESIS IMAGING EQUIPMENT

(71) Applicant: Institute of Nuclear Energy Research, Atomic Energy Council, Executive Yuan, R.O.C, Taoyuan (TW)

(72) Inventors: Chia-Hao Chang, Taoyuan (TW); Sheng-Pin Tseng, Taoyuan (TW); Yu-Ching Ni, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 238 days.

(21) Appl. No.: 18/220,365

(22) Filed: Jul. 11, 2023

(65) Prior Publication Data
US 2024/0341705 A1 Oct. 17, 2024

(30) Foreign Application Priority Data
Apr. 13, 2023 (TW) .................................. 112113906

(51) Int. Cl.
*A61B 6/00* (2006.01)
*A61B 6/02* (2006.01)
*A61B 6/50* (2024.01)

(52) U.S. Cl.
CPC ............ *A61B 6/4405* (2013.01); *A61B 6/025* (2013.01); *A61B 6/4452* (2013.01); *A61B 6/502* (2013.01)

(58) Field of Classification Search
CPC ........... A61B 6/00; A61B 6/02; A61B 6/4405; A61B 6/025; A61B 6/4452; A61B 6/502
See application file for complete search history.

(56) References Cited

U.S. PATENT DOCUMENTS

2015/0131775 A1* 5/2015 Yorkston .............. A61B 6/4405
378/17

* cited by examiner

*Primary Examiner* — Jurie Yun
(74) *Attorney, Agent, or Firm* — Troutman Pepper Locke LLP; Tim Tingkang Xia, Esq.

(57) ABSTRACT

A mobile tomosynthesis imaging equipment includes an adjustment mechanism, a light source, an image receptor and a mobile base. The adjustment mechanism is connected between the light source and the image receptor. The adjustment mechanism includes a rotating shaft. The light source, movably connected to the adjustment mechanism, is rotated about the rotating shaft and moved in a first direction with respect to the rotating shaft. The image receptor, movably connected to the adjustment mechanism, is rotated about the rotating shaft and moved in a second direction with respect to the rotating shaft. The mobile base, movably disposed to a bottom of the adjustment mechanism, is to move the adjustment mechanism, the light source and the image receptor, and to move the rotating shaft in a third direction.

6 Claims, 3 Drawing Sheets

MOBILE TOMOSYNTHESIS IMAGING EQUIPMENT

CROSS REFERENCE TO RELATED APPLICATION

This application claims the benefits of Taiwan application Serial No. 112113906, filed on Apr. 13, 2023, the disclosures of which are incorporated by references herein in its entirety.

TECHNICAL FIELD

The present disclosure relates in general to a mobile tomosynthesis imaging equipment.

BACKGROUND

The digital tomosynthesis (DTS) system has been widely used as a clinical diagnostic tool in various medical imaging applications, such as digital breast tomosynthesis and digital thoracic tomosynthesis. During an imaging process of the digital tomosynthesis system, the X-ray source moves in a limited angle to obtain a series of projection images of an object to be measured. Such a system can provide a series of images with three-dimensional (3D) information.

However, at present, most of the DTS systems are individually equipped with fixed radiography mechanisms. For example, in a conventional patio X-ray imaging apparatus, an X-ray source can move in a horizontal direction to image a subject in a supine position, or in a vertical direction to image the subject in a standing position. However, on another hand, in a conventional standing X-ray imaging apparatus, the X-ray source can move in the horizontal direction so as to allow the subject to be imaged in the supine position, but cannot be moved in any direction to image a subject in a standing position. These conventional imaging apparatuses are all fixed on the floor or ceiling of the imaging room, from which the application range of the corresponding digital tomosynthesis would be limited.

SUMMARY

In this disclosure, a mobile tomosynthesis imaging equipment mainly includes two scan modes: a supine-position mode and a standing-position mode. While in the supine-position mode, this equipment can be applied to a patient unable to move on his or her own, such as the patient in an ICU ward or the patient for an orthopedic surgery, and the mobile tomosynthesis imaging equipment can be moved close to a hospital bed or an operating table for performing a direct digital tomosynthesis, such that the risk in moving the patient can be reduced. While in the standing-position mode, this equipment can be applied to a patient in an isolation ward or in a rural area, and the mobile tomosynthesis imaging equipment can be moved to the isolation ward for reducing possible nosocomial infection caused by patient movement, or placed on an X-ray patrol car and moved to a rural area for service local residents who are exempted from traveling to an urban area for inspection.

In this disclosure, the mobile tomosynthesis imaging equipment includes an adjustment mechanism, a light source, an image receptor and a mobile base. The adjustment mechanism is connected between the light source and the image receptor. The adjustment mechanism includes a rotating shaft. The light source, movably connected to the adjustment mechanism, is rotated about the rotating shaft and moved in a first direction with respect to the rotating shaft. The image receptor, movably connected to the adjustment mechanism, is rotated about the rotating shaft and moved in a second direction with respect to the rotating shaft. The mobile base, movably disposed to a bottom of the adjustment mechanism, is to move the adjustment mechanism, the light source and the image receptor, and to move the rotating shaft in a third direction.

In one embodiment of this disclosure, the adjustment mechanism includes a first mobile telescopic element connected between the light source and the rotating shaft to adjust a position of the light source with respect to the rotating shaft.

In one embodiment of this disclosure, the adjustment mechanism includes a second mobile telescopic element connected between the image receptor and the rotating shaft to adjust a position of the image receptor with respect to the rotating shaft.

In one embodiment of this disclosure, the adjustment mechanism includes a third mobile telescopic element connected between the mobile base and the rotating shaft to adjust a position of the mobile base with respect to the rotating shaft.

In one embodiment of this disclosure, the mobile base is disposed under the light source, the image receptor and the rotating shaft.

In one embodiment of this disclosure, the light source is an X-ray emitting element.

In one embodiment of this disclosure, the image receptor is an X-ray receiving element.

In one embodiment of this disclosure, the mobile base includes a base and a mobile element connected with the base.

In one embodiment of this disclosure, the mobile element includes a plurality of rollers.

As stated above, the mobile tomosynthesis imaging equipment in this disclosure provides superior motion mechanisms and scanning modes to resolve the shortcoming of the conventional fixed digital tomosynthesis system in the limited range of service, and thus the mobile tomosynthesis imaging equipment in this disclosure can be applied to perform ICU ward imaging, orthopedic intraoperative positioning imaging, and imaging in isolation wards or for remote rural patients.

Furthermore, the mobile tomosynthesis imaging equipment proposed in this disclosure can also overcome the problem of images overlapping for a conventional mobile flat-panel X-ray machine improve the efficiency of medical diagnosis, and significantly reduce radiation doses (only 1.5 times of that in the conventional mobile flat-panel X-ray machine in a previous study).

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
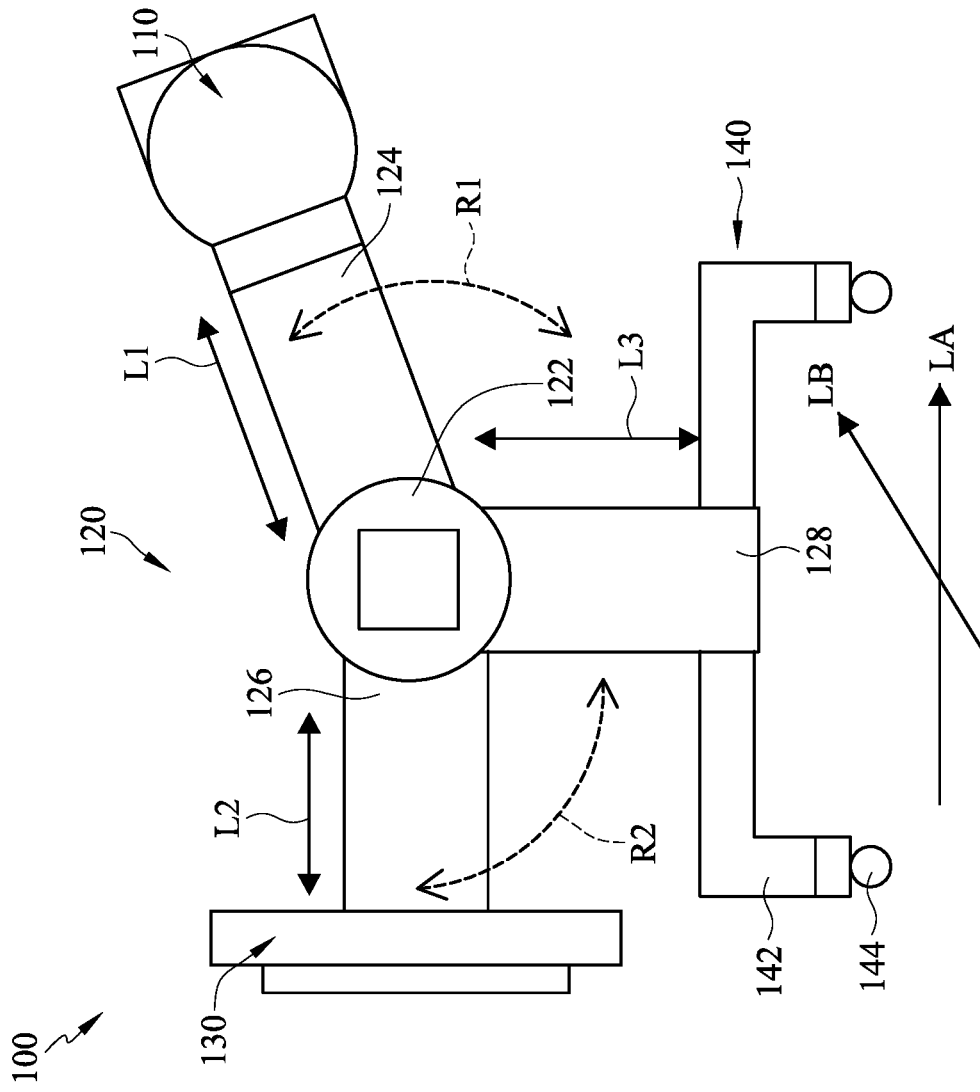
FIG. 1 is a schematic view of a preferred mobile tomosynthesis imaging equipment in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The terms "including", "comprising", "having" and the like mentioned in this disclosure are all open terms; i.e., implying only "including but not limited to".

In the description of embodiments, when terms such as "first", "second", "third", "fourth" etc. are used to describe elements, they are only used to distinguish these elements from each other, but not limit order or importance of any of these elements.

In the descriptions of various embodiments, the so-called "coupling" or "connection" may refer to two or a plurality of components making physical or electrical contact directly or indirectly with each other, or refer to the mutual operation or action of two or a plurality of elements.

Figure 2:
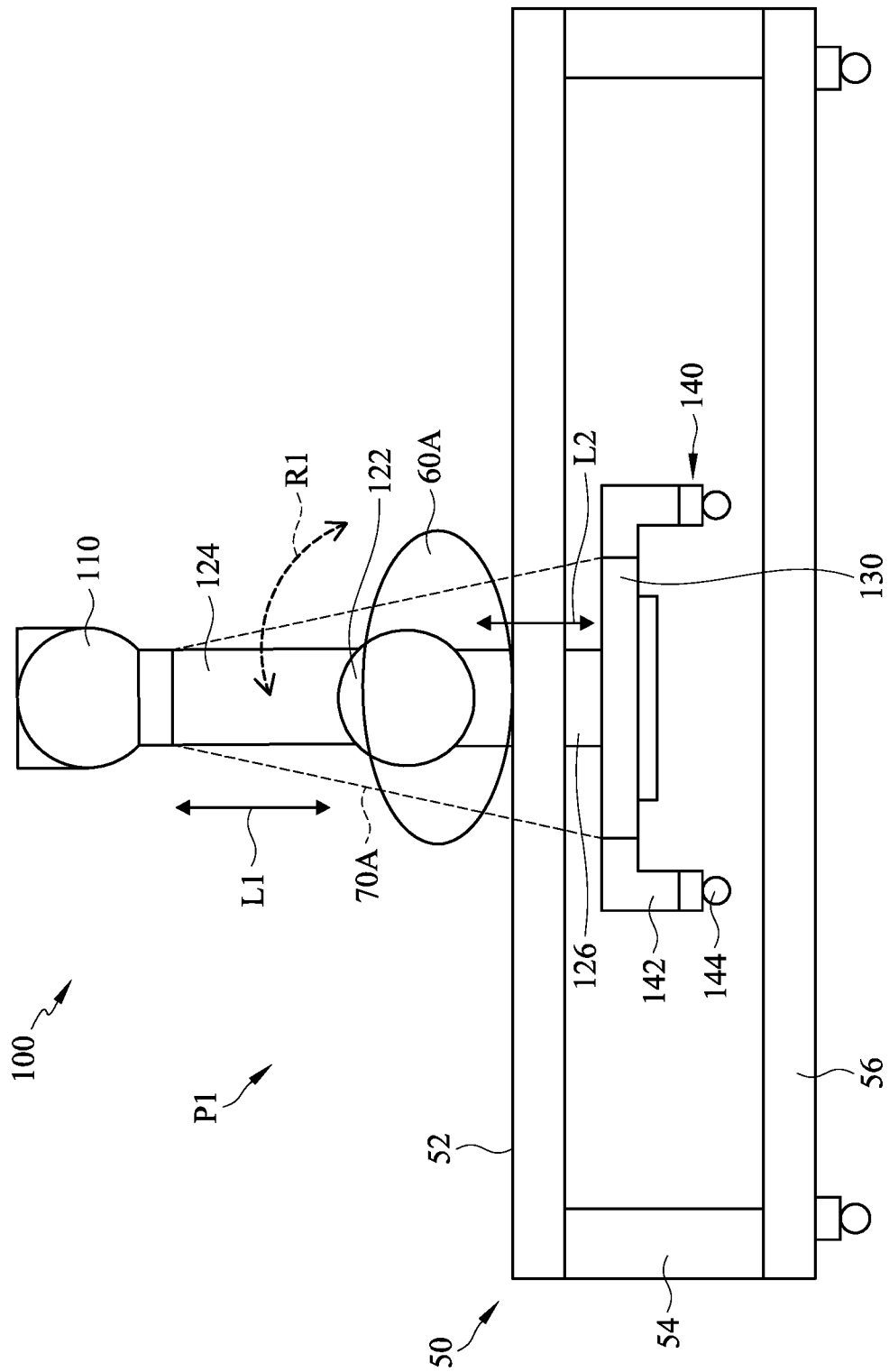
FIG. 2 is a schematic view showing that the mobile tomosynthesis imaging equipment of FIG. 1 is applied to a subject in a supine position.
Figure 3:
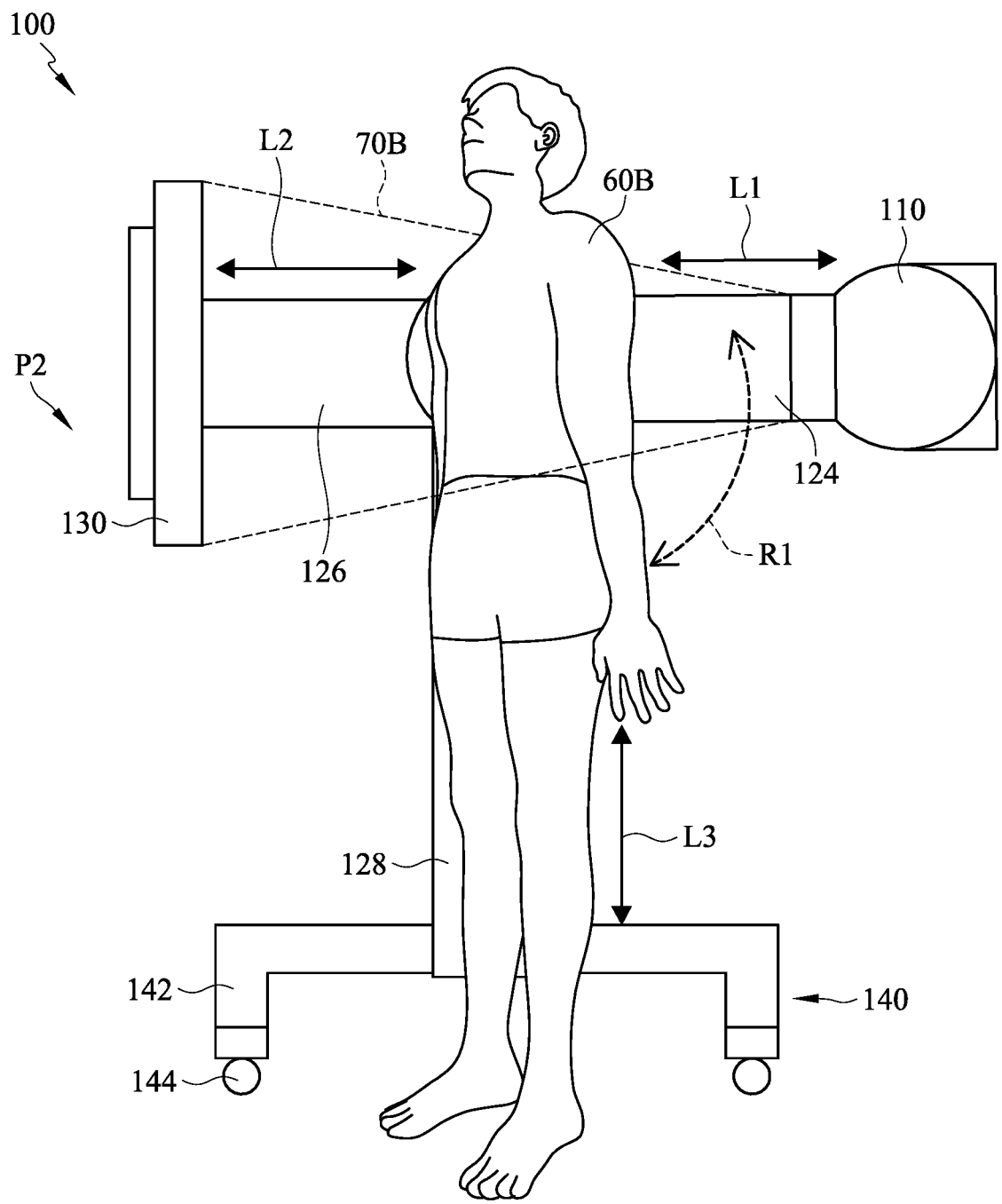
FIG. 3 is a schematic view showing that the mobile tomosynthesis imaging equipment of FIG. 1 is applied to a subject in a standing position.

FIG. 1 is a schematic view of a preferred mobile tomosynthesis imaging equipment in accordance with this disclosure. FIG. 2 is a schematic view showing that the mobile tomosynthesis imaging equipment of FIG. 1 is applied to a subject in a supine position. FIG. 3 is a schematic view showing that the mobile tomosynthesis imaging equipment of FIG. 1 is applied to a subject in a standing position. Referring to FIG. 1 to FIG. 3, the mobile tomosynthesis imaging equipment 100 of this disclosure provides operationally a supine-position scan mode P1 to a subject 60A as shown in FIG. 2, and a standing-position scan mode P2 to another subject 60B as shown in FIG. 3.

In this disclosure, the mobile tomosynthesis imaging equipment 100 includes a light source 110, an adjustment mechanism 120, an image receptor 130 and a mobile base 140. The adjustment mechanism 120, disposed between the light source 110 and the image receptor 130, includes a rotating shaft 122. The light source 110 is movably connected to the adjustment mechanism 120, such that the light source 110 can rotate about the rotating shaft 122 in a first rotational direction R1. Namely, the light source 110 can be rotated with respect to the rotating shaft 122, and displaced in a first direction L1 with respect to the rotating shaft 122. The image receptor 130 is movably connected to adjustment mechanism 120, such that the image receptor 130 can rotate about the rotating shaft 122 in a second rotational direction R2. Namely, the image receptor 130 can be rotated with respect to the rotating shaft 122, and displaced in a second direction L2 with respect to the rotating shaft 122. The mobile base 140 is movably disposed to a bottom of the adjustment mechanism 120, such that the mobile base 140 can move horizontally the adjustment mechanism 120 on a surface spanned by the first moving direction LA and the second moving direction LB. In addition, the light source 110, the image receptor 130 and the rotating shaft 122 can move in a third direction L3 with respect to the mobile base 140.

As described above, the mechanism constructed by the light source 110, the adjustment mechanism 120, the image receptor 130 and the mobile base 140 can provide two different scan modes; i.e., the supine-position scan mode P1 as shown in FIG. 2 and the standing-position scan mode P2 as shown in FIG. 3. Thereupon, the limitation in service coverage at the conventional fixed digital tomosynthesis can be substantially resolved. Namely, this mechanism provided in this disclosure can be extended to perform the ICU radiography and the orthopedic intra-operative positioning imaging, and provide service to patients in isolation wards or rural areas.

In the preferred embodiment of this disclosure, as shown in FIG. 1, the first direction L1 is different to the second direction L2. For example, the first direction L1 may be opposite to the second direction L2. The light source 110 can be moved toward the rotating shaft 122 in the first direction L1, while the image receptor 130 can move away from the rotating shaft 122 in the second direction L2. In another embodiment, the first direction L1 may be identical to the second direction L2, and the light source 110 and the image receptor 130 may move individually toward the rotating shaft 122.

In the prefer embodiment of this disclosure, as shown in FIG. 1, the rotating shaft 122 can move in the third direction L3 with respect to the mobile base 140, and the third direction L3 is different to each of the first direction L1 and the second direction L2. In particular, the third direction L3 is an upright direction.

Except for the mechanism consisted of the light source 110, the adjustment mechanism 120, the image receptor 130 and the mobile base 140, in one embodiment of this disclosure, the light source 110 can be an X-ray emitting element, and the image receptor 130 can be a corresponding X-ray receiving element.

In one embodiment of this disclosure, the mobile base 140 is disposed under the light source 110, the image receptor 130 and the rotating shaft 122. Practically, the mobile base 140 includes a base 142 and a mobile element 144, in which the base 142 is connected under the adjustment mechanism 120, and the mobile element 144 is connected with the base 142. The mobile element 144 includes a plurality of rollers for easily moving the mobile tomosynthesis imaging equipment 100. In addition, the mobile base 140 can move the mobile tomosynthesis imaging equipment 100 in an electrical or a manual manner.

Except for the mechanism consisted of the light source 110, the adjustment mechanism 120, the image receptor 130 and the mobile base 140, in one embodiment of this disclosure, the adjustment mechanism 120 includes three mobile telescopic elements to work with the rotating shaft 122; i.e., a first mobile telescopic element 124, a second mobile telescopic element 126 and a third mobile telescopic element 128. The first mobile telescopic element 124, connected between the light source 110 and the rotating shaft 122, is to move the light source 110 in the first direction L1 with respect to the rotating shaft 122, such that the position of the light source 110 with respect to the rotating shaft 122 can be adjusted. In this embodiment, the first mobile telescopic element 124 is responsible for adjusting the distance between the X-ray source 110 and the subject so as to have the X-ray source 110 to rotate about the rotating shaft 122 for obtaining images at different angles during a digital tomosynthesis process. The second mobile telescopic element 126, connected between the image receptor 130 and the rotating shaft 122, is to move the image receptor 130 in the second direction L2 with respect to the rotating shaft 122, such that the position of the image receptor 130 with respect to the rotating shaft 122 can be adjusted. In this embodiment, the second mobile telescopic element 126 is responsible for adjusting the distance between the image receptor 130 and the subject so as to meet different poses of the subject and different distances between the image receptor 130 and the subject. In addition, according to different imaging scenarios, the second mobile telescopic element 126 can rotate the image receptor 130 about the rotating shaft 122 so as to determine whether the image receptor 130 is to pose at a vertical or horizontal position with respect to the ground. The third mobile telescopic element 128, connected between the mobile base 140 and the rotating shaft 122, is to move the rotating shaft 122 in the third direction L3 with respect to the mobile base 140, such that the position of the mobile base 140 with respect to the rotating shaft 122 can be adjusted. In accordance with this disclosure, the first mobile telescopic element 124, the second mobile telescopic element 126 and the third mobile telescopic element 128 can all be controlled to move or rotate in an electric manner.

Referring to FIG. 2, the imaging in a supine-position scan mode P1 is schematically illustrated. Generally, the subject 60A to be tested in this mode is usually unable to move on his or her own, is connected to life support lines in an ICU ward, or has been paralyzed during an orthopedic surgery for positioning or imaging bone nails or other implants. In any of these situations, the mobile tomosynthesis imaging equipment 100 can be firstly moved close to a hospital bed or an operating table for performing a direct digital tomosynthesis process and thus lowering a risk from transporting the subject 60A. During the direct digital tomosynthesis process, the subject 60A is firstly arranged to lie on an imaging bed 50, and the mobile tomosynthesis imaging equipment 100 is move close to the imaging bed 50. As shown in FIG. 2, the imaging bed 50 includes a bed board 52, at least one side board 54 and a bottom board 56. The image receptor 130 is pushed into a space under the bed board 52 so as to align an interested portion of the subject 60A to be imaged, the image receptor 130 is moved in the second direction L2 with respect to the rotating shaft 122 so as to vary a vertical height of the image receptor 130 from the ground for further controlling a distance from the rotating shaft 122 to the image receptor 130 (i.e., an axis-to-image receptor distance, AID), and the X-ray source 110 is then moved in the first direction with respect to the rotating shaft 122 so as to adjust a height of the X-ray source 110 from the ground for further controlling a distance from the X-ray source 110 to the rotating shaft 122 (i.e., a source-to-axis distance, SAD). By varying the AID and the SAD, the imaging magnification can be modified to determine a viewing field and an application scope of a corresponding imaging area 70A. If the viewing field of the imaging is to be enlarged, the AID shall be reduced, but the SAD shall be increased. Then, after positioning of the X-ray source 110, the subject 60A and the image receptor 130 is set, then imaging parameters for performing the digital tomosynthesis process can be defined. These imaging parameters may include at least a tube voltage, a tube current, an exposure time, a number of captured images, a scanning angle range, etc. Then, the X-ray source can undergo a small-angle rotation about the rotating shaft so as to obtain various images at different angles (for example, discrete images along the first rotational direction R1). Further, these images would be used integrally to reconstruct a 3D image of a body coronal plane by applying an iterative image-reconstructing algorithm. Generally speaking, the number of the images captured at different angles by the mobile tomosynthesis imaging equipment 100 of this disclosure would be less than that by the conventional fixed digital tomosynthesis system (for example, drops from 60 sheets to 15~30 sheets). Obviously, the mobile tomosynthesis imaging equipment 100 of this disclosure is superior to the conventional design in shortening the scanning time, reducing the artifacts from unexpected subject movement (for example, uncontrollable breathing), and lowering the radiation dose.

Referring to FIG. 3, the imaging in a standing-position scan mode P2 is schematically illustrated. As shown, the image receptor 130 is vertical to the ground. The third mobile telescopic element 128, connected with the mobile base 140, provide a support for the first mobile telescopic element 124, the second mobile telescopic element 126 and the rotating shaft 122, such that the heights of the first mobile telescopic element 124 and the second mobile telescopic element 126 from the ground can be controlled by varying the length of the third mobile telescopic element 128 in the third direction L3, such that the pose of the patient as well as the body portion interested to be imaged can be targeted.

For this standing-position scan mode, most of these subjects 60B can still move by themselves. These patients may include patients in isolation wards or in rural areas away from a hospital capable of processing related examinations. In imaging, the subject 60B is firstly arranged to stand between the X-ray source 110 and the image receptor 130, as shown in FIG. 3. The subject 60B may be asked to face or face off the X-ray source 110, and the heights of the X-ray source 110 and the image receptor 130 from the ground in the third direction L3 would be determined by the body portion to be imaged. With the X-ray source 110 and the image receptor 130 to align the body portion to be imaged (i.e., the chest in FIG. 3), then the AID between the rotating shaft 122 and the image receptor 130 can be determined by moving the second mobile telescopic element 126 in the second direction L2, and the SAD between the X-ray source 110 and the rotating shaft 122 can be determined by moving the first mobile telescopic element 124 in the first direction L1. Through adjusting the AID and the SAD, the imaging magnification, the viewing field and application scope of the imaging area 70B can be determined. Then, after positioning of the X-ray source 110, the subject 60B and the image receptor 130 is set, then the imaging parameters for performing the digital tomosynthesis process can be defined. These imaging parameters may include at least a tube voltage, a tube current, an exposure time, a number of captured images, a scanning angle range, etc. Then, the X-ray source 110 can undergo a small-angle rotation about the rotating shaft so as to obtain various images at different angles (for example, discrete images along the first rotational direction R1). Further, these images would be used integrally to reconstruct a 3D image of a body coronal plane by applying an iterative image-reconstructing algorithm. Generally speaking, as shown in FIG. 3, for these subjects 60B to be imaged at standing positions, self-breathing control is usually not a concern, thus the imaging parameters for the conventional fixed digital tomosynthesis system can be directly adopted by the mobile tomosynthesis imaging equipment 100 of this disclosure, without affecting the imaging quality. In addition, the mobile tomosynthesis imaging equipment 100 of this disclosure can provide a highly mobile scanning performance, which is hard to achieve by the conventional fixed digital tomosynthesis system.

To sum up, the mobile tomosynthesis imaging equipment in this disclosure provides superior motion mechanisms and scanning modes to resolve the shortcoming of the conventional fixed digital tomosynthesis system in the limited range of service, and thus the mobile tomosynthesis imaging equipment in this disclosure can be applied to perform ICU ward imaging, orthopedic intraoperative positioning imaging, and imaging in isolation wards or for remote rural patients.

Furthermore, the mobile tomosynthesis imaging equipment proposed in this disclosure can also overcome the problem of images overlapping for a conventional mobile X-ray machine improve the efficiency of medical diagnosis, and significantly reduce radiation doses (only 1.5 times of that in the conventional mobile flat-panel X-ray machine in a previous study).

In addition, the mobile tomosynthesis imaging equipment proposed in this disclosure benefits from the characteristics of the digital tomosynthesis mode by providing an enlarged viewing field more than 35×35 cm$^2$, which greatly increases the application range. Also, the preliminary assessment of the radiation dose is about 8%~15% of a conventional mobile CT, and thus the risk of radiation hazards has be greatly reduced.

In addition, since the price of the mobile tomosynthesis imaging equipment proposed in this disclosure is only 16%~25% of that of the conventional mobile CT, and the mobile tomosynthesis imaging equipment proposed in this disclosure can provide a 3D image, thus the imaging performance and the price of the mobile tomosynthesis imaging equipment proposed in this disclosure are competitive.

Further, the mobile tomosynthesis imaging equipment proposed in this disclosure is furnished with rollers, and thus operators to move the mobile tomosynthesis imaging equipment would work much more easily.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A mobile tomosynthesis imaging equipment, comprising:
    an adjustment mechanism, including a rotating shaft, a first mobile telescopic element, a second mobile telescopic element and a third mobile telescopic element;
    a light source, movably connected to the adjustment mechanism via the first mobile telescopic element, rotated about the rotating shaft and moved in a first direction with respect to the rotating shaft, wherein the first mobile telescopic element is configured to adjust a position of the light source with respect to the rotating shaft;
    an image receptor, the adjustment mechanism being connected between the light source and the image receptor, movably connected to the adjustment mechanism via the second mobile telescopic element, rotated about the rotating shaft and moved in a second direction with respect to the rotating shaft, wherein the second mobile telescopic element is configured to adjust a position of the image receptor with respect to the rotating shaft; and
    a mobile base, movably disposed to a bottom of the adjustment mechanism and connected to the rotating shaft via the third mobile telescopic element, being to move the adjustment mechanism, the light source and the image receptor, being to move the rotating shaft in a third direction, wherein the third mobile telescopic element is configured to adjust a position of the mobile base with respect to the rotating shaft.

2. The mobile tomosynthesis imaging equipment of claim 1, wherein the mobile base is disposed under the light source, the image receptor and the rotating shaft.

3. The mobile tomosynthesis imaging equipment of claim 1, wherein the light source is an X-ray emitting element.

4. The mobile tomosynthesis imaging equipment of claim 1, wherein the image receptor is an X-ray receiving element.

5. The mobile tomosynthesis imaging equipment of claim 1, wherein the mobile base includes a base and a mobile element connected with the base.

6. The mobile tomosynthesis imaging equipment of claim 5, wherein the mobile element includes a plurality of rollers.

* * * * *